US010459622B1

United States Patent
Uradnik

(10) Patent No.: US 10,459,622 B1
(45) Date of Patent: Oct. 29, 2019

(54) SYSTEMS AND METHODS FOR INTERACTING WITH VIDEO CONTENT

(71) Applicant: GoPro, Inc., San Mateo, CA (US)

(72) Inventor: Jakub Uradnik, San Diego, CA (US)

(73) Assignees: GoPro, Inc.; Esplin & Associates, PC

( * ) Notice: Subject to any disclaimer, the term of this patent is extended or adjusted under 35 U.S.C. 154(b) by 0 days.

(21) Appl. No.: 15/801,559

(22) Filed: Nov. 2, 2017

(51) Int. Cl.
  *G06F 3/0488* (2013.01)
  *G06F 3/0484* (2013.01)
  *G06F 3/0485* (2013.01)

(52) U.S. Cl.
  CPC .......... *G06F 3/0488* (2013.01); *G06F 3/0485* (2013.01); *G06F 3/04845* (2013.01); *G06F 3/04847* (2013.01)

(58) Field of Classification Search
  CPC .............. G06F 3/0488; G06F 3/04845; G06F 3/04847; G06F 3/0485
  See application file for complete search history.

(56) References Cited

U.S. PATENT DOCUMENTS

| | | | | |
|---|---|---|---|---|
| 5,452,413 A * | 9/1995 | Blades | ................. | G06F 3/04845 715/786 |
| 5,764,276 A * | 6/1998 | Martin | ................... | G06T 3/0062 725/146 |
| 6,795,113 B1 * | 9/2004 | Jackson | ................ | G06T 3/0062 348/207.1 |
| 2003/0071891 A1 * | 4/2003 | Geng | ................... | H04N 5/2259 348/39 |
| 2003/0160863 A1 * | 8/2003 | Kakou | ............. | G08B 13/19602 348/46 |
| 2004/0233274 A1 * | 11/2004 | Uyttendaele | ....... | H04N 5/23238 348/36 |
| 2005/0041100 A1 * | 2/2005 | Maguire, Jr. | ........... | G06F 3/011 348/121 |
| 2007/0025723 A1 * | 2/2007 | Baudisch | ................ | G03B 13/02 396/287 |
| 2010/0302280 A1 * | 12/2010 | Szeliski | ................... | G06T 13/80 345/660 |
| 2011/0055696 A1 * | 3/2011 | Dollar | .................... | G06F 3/0482 715/702 |
| 2011/0302527 A1 * | 12/2011 | Chen | ...................... | G06F 3/0488 715/800 |
| 2012/0127284 A1 * | 5/2012 | Bar-Zeev | ............. | G02B 27/017 348/53 |

(Continued)

*Primary Examiner* — Nathan J Flynn
*Assistant Examiner* — Tung T Trinh
(74) *Attorney, Agent, or Firm* — Esplin & Associates, PC

(57) ABSTRACT

Video content may be presented on a touchscreen display. A viewing window for the video content may define an extent of the video content presented on the touchscreen display. Reception of an automatic movement input by the touchscreen display during the presentation of the video content may be determined. The automatic movement input may include user engagement with the touchscreen display that moves along the touchscreen display to an edge of the touchscreen display during an input period. The movement along the touchscreen display may cause a movement of the viewing window during the input period. Based on the automatic movement input, the movement of the viewing window may be continued after the input period. The movement of the viewing window after the input period may be continuous with the movement of the viewing window during the input period.

20 Claims, 9 Drawing Sheets

(56) References Cited

U.S. PATENT DOCUMENTS

| | | | | |
|---|---|---|---|---|
| 2012/0206565 A1* | 8/2012 | Villmer | .................. | H04N 1/00 348/36 |
| 2013/0002718 A1* | 1/2013 | Kato | .................... | G06F 1/1626 345/659 |
| 2013/0067332 A1* | 3/2013 | Greenwood | .......... | G06F 3/0488 715/720 |
| 2013/0307792 A1* | 11/2013 | Andres | ................ | G11B 27/005 345/173 |
| 2014/0178047 A1* | 6/2014 | Apodaca | ................ | G06F 3/041 386/248 |
| 2014/0258854 A1* | 9/2014 | Li | ........................ | G06F 3/0484 715/702 |
| 2014/0320394 A1* | 10/2014 | Costanzo | .............. | G06F 1/1694 345/156 |
| 2014/0368426 A1* | 12/2014 | Umehara | .................. | G06F 3/01 345/156 |
| 2015/0121225 A1* | 4/2015 | Somasundaram | .......................... | H04N 21/42224 715/721 |
| 2015/0370402 A1* | 12/2015 | Checkley | ......... | H04N 21/41407 345/173 |
| 2016/0005435 A1* | 1/2016 | Campbell | .............. | H04N 9/806 386/240 |
| 2016/0321779 A1* | 11/2016 | Fujita | .................... | G06T 3/0018 |
| 2017/0124622 A1* | 5/2017 | Kliper | ................ | G06Q 30/0625 |
| 2017/0223368 A1* | 8/2017 | Abbas | ................. | H04N 19/146 |
| 2017/0229153 A1* | 8/2017 | Moore | ................. | G11B 27/031 |
| 2017/0238043 A1* | 8/2017 | Zvinakis | .............. | H04N 21/422 725/38 |
| 2017/0272698 A1* | 9/2017 | Liu | ....................... | G06T 3/4038 |
| 2018/0075652 A1* | 3/2018 | Kim | ....................... | G06T 19/003 |
| 2018/0121069 A1* | 5/2018 | DiVerdi | ............. | G06F 3/04847 |
| 2018/0307352 A1* | 10/2018 | Stimm | ................... | G06F 3/048 |
| 2019/0037269 A1* | 1/2019 | Chen | ............... | H04N 21/44008 |

* cited by examiner

SYSTEMS AND METHODS FOR INTERACTING WITH VIDEO CONTENT

FIELD

This disclosure relates to interaction with video content enabling continuous movement of viewing window subsequent to user input.

BACKGROUND

A video may include greater visual capture of one or more scenes/objects/activities than may be viewed at a time (e.g., over-capture). Manually changing a viewing window for a video may be difficult and break a user's immersion in experiencing the video.

SUMMARY

This disclosure relates to interacting with video content. Video information defining video content may be accessed. The video content may have a progress length. The video content may define visual content viewable as a function of progress through the video content. A viewing window for the video content may be determined. The viewing window may define an extent of the visual content presented on a touchscreen display as the function of progress through the video content. The touchscreen display may be configured to present the video content and receive user input during the presentation of the video content. The touchscreen display may be configured to generate touchscreen output signals indicating locations on the touchscreen display of user engagement with the touchscreen display. Presentation of the video content on the touchscreen display may be effectuated based on the viewing window.

Reception of an automatic movement input by the touchscreen display during the presentation of the video content may be determined based on the touchscreen output signals. The automatic movement input may include user engagement with the touchscreen display that moves along the touchscreen display to an edge of the touchscreen display during an input period. The movement along the touchscreen display may cause a movement of the viewing window in one or more corresponding directions during the input period. Based on the automatic movement input, the movement of the viewing window may be continued after the input period. The movement of the viewing window after the input period may be continuous with the movement of the viewing window during the input period.

A system for interacting with video content may include one or more of electronic storage, touchscreen display, processor, and/or other components. The touchscreen display may be configured to present video content and/or other information. The touchscreen display may be configured to receive user input during the presentation of the video content. The touchscreen display may be configured to generate touchscreen output signals indicating locations on the touchscreen display of user engagement with the touchscreen display.

The electronic storage may store video information defining video content, and/or other information. Video content may refer to media content that may be consumed as one or more videos. Video content may include one or more videos stored in one or more formats/containers, and/or other video content. Video content may have a progress length. The video content may define visual content viewable as a function of progress through the video content. In some implementations, video content may include one or more of spherical video content, virtual reality content, and/or other video content. Spherical video content and/or virtual reality content may define visual content viewable from a point of view as a function of progress through the spherical video/virtual reality content.

The processor(s) may be configured by machine-readable instructions. Executing the machine-readable instructions may cause the processor(s) to facilitate interacting with video content. The machine-readable instructions may include one or more computer program components. The computer program components may include one or more of an access component, a viewing window component, a presentation component, a user input component, a movement component, and/or other computer program components.

The access component may be configured to access the video information defining one or more video content and/or other information. The access component may access video information from one or more locations. The access component may be configured to access video information defining one or more video content during acquisition of the video content and/or after acquisition of the video content by one or more image sensors.

The viewing window component may be configured to determine one or more viewing windows for the video content. The viewing window may define an extent of the visual content presented on the touchscreen display as the function of progress through the video content. The viewing window may be characterized by a viewing direction, viewing size, and/or other information.

The presentation component may be configured to effectuate presentation of the video content on the touchscreen display. For example, the presentation component may effectuate presentation of spherical video content on the touchscreen display. The video content may be presented on the touchscreen display based on the viewing window and/or other information.

The user input component may be configured to determine reception of user input by the touchscreen display. The user input component may be configured to determine reception of an automatic movement input by the touchscreen display during the presentation of the video content based on the touchscreen output signals and/or other information. The automatic movement input may include user engagement with the touchscreen display that moves along the touchscreen display to an edge of the touchscreen display during an input period. The movement along the touchscreen display may cause a movement of the viewing window in one or more corresponding directions during the input period.

In some implementations, the automatic movement input may further include user engagement with the touchscreen display that includes a stretching gesture or a pinching gesture followed by a panning gesture to the edge of the touchscreen display. In some implementations, the automatic movement input may further include user engagement with the touchscreen display that includes moving a virtual joystick to the edge of the touchscreen display or a movement boundary of the virtual joystick.

In some implementations, user input component may be configured to determine reception of a shifting movement input by the touchscreen display. The user input component may be configured to determine reception of a shifting movement input by the touchscreen display during the movement of the viewing window after the input period based on the touchscreen output signals and/or other information. The shifting movement input may include user engagement with the touchscreen display that moves along the edge of the touchscreen display.

The movement component may be configured to move the viewing window based on user input and/or other information. The movement component may move the viewing window in one or more corresponding directions during the input period based on user engagement with the touchscreen display that moves along the touchscreen display and/or other information. The movement component may, based on the automatic movement input and/or other information, continue moving the viewing window after the input period. The movement of the viewing window after the input period may be continuous with the movement of the viewing window during the input period. In some implementations, the movement of the viewing window after the input period may include a linear movement. In some implementations, the movement of the viewing window after the input period may include a non-linear movement. In some implementations, the movement of the viewing window after the input period may follow an object captured within the video content.

In some implementations, the movement component may be configured to change a trajectory of the movement of the viewing window after the input period based on the shifting movement input and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
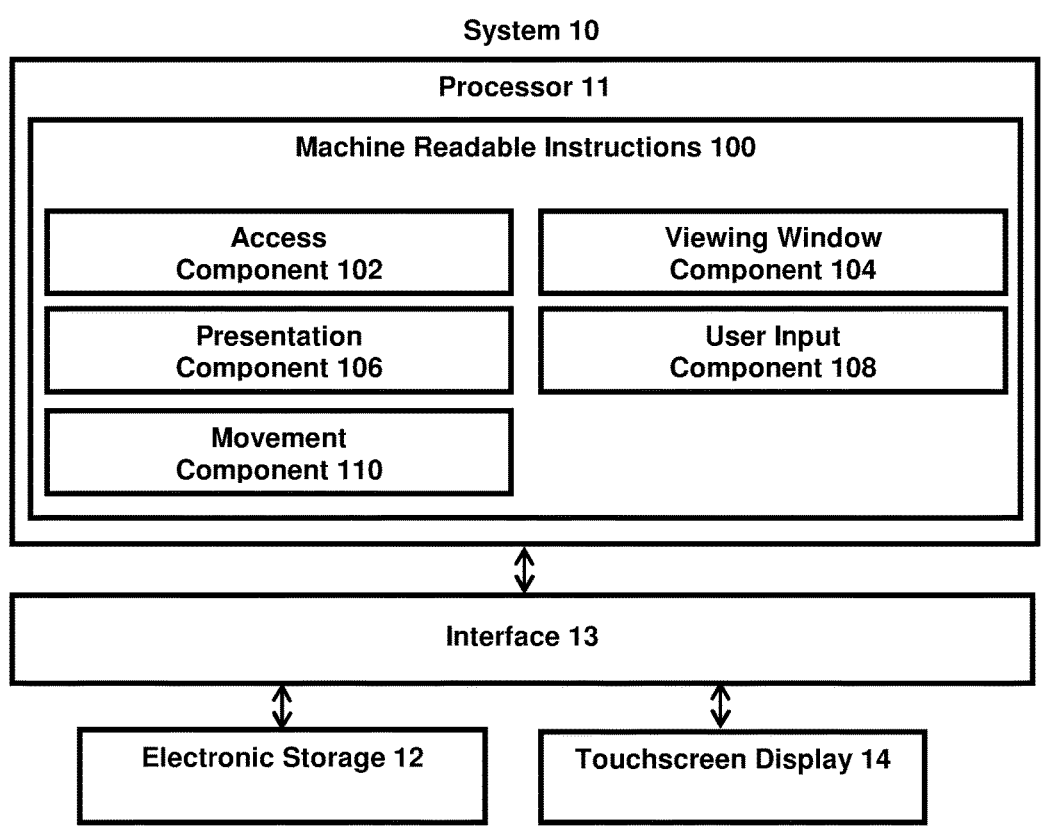
FIG. 1 illustrates a system that enables interaction with video content.

FIG. 1 illustrates a system 10 for interacting with video content. The system 10 may include one or more of a processor 11, an electronic storage 12, an interface 13 (e.g., bus, wireless interface), a touchscreen display 14, and/or other components. Video information defining video content may be accessed by the processor 11. The video content may have a progress length. The video content may define visual content viewable as a function of progress through the video content. A viewing window for the video content may be determined. The viewing window may define an extent of the visual content presented on the touchscreen display 14 as the function of progress through the video content. The touchscreen display 14 may be configured to present the video content and receive user input during the presentation of the video content. The touchscreen display 14 may be configured to generate touchscreen output signals indicating locations on the touchscreen display 14 of user engagement with the touchscreen display 14. Presentation of the video content on the touchscreen display 14 may be effectuated based on the viewing window.

Reception of an automatic movement input by the touchscreen display 14 during the presentation of the video content may be determined based on the touchscreen output signals. The automatic movement input may include user engagement with the touchscreen display 14 that moves along the touchscreen display 14 to an edge of the touchscreen display 14 during an input period. The movement along the touchscreen display 14 may cause a movement of the viewing window in one or more corresponding directions during the input period. Based on the automatic movement input, the movement of the viewing window may be continued after the input period. The movement of the viewing window after the input period may be continuous with the movement of the viewing window during the input period.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to video information, video content, viewing window, user input, and/or other information.

For example, the electronic storage 12 may store video information defining one or more video content and/or other information. Video content may refer to media content that may be consumed as one or more videos. Video content may include one or more videos stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format). A video may include a video clip captured by a video capture device, multiple video clips captured by a video capture device, and/or multiple video clips captured by different video capture devices. A video may include multiple video clips captured at the same time and/or multiple video clips captured at different times. A video may include a video clip processed by a video application, multiple video clips processed by a video application and/or multiple video clips processed by different video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

Video content may define visual content viewable as a function of progress through the video content. In some implementations, video content may include one or more of spherical video content, virtual reality content, and/or other video content. Spherical video content and/or virtual reality content may define visual content viewable from a point of view as a function of progress through the spherical video/virtual reality content.

Spherical video content may refer to a video capture of multiple views from a location. Spherical video content may include a full spherical video capture (360 degrees of capture, including opposite poles) or a partial spherical video capture (less than 360 degrees of capture). Spherical video content may be captured through the use of one or more cameras/image sensors to capture images/videos from a location. For example, multiple images/videos captured by multiple cameras/image sensors may be stitched together to form the spherical video content. The field of view of cameras/image sensor(s) may be moved/rotated (e.g., via movement/rotation of optical element(s), such as lens, of the image sensor(s)) to capture multiple images/videos from a location, which may be stitched together to form the spherical video content. In some implementations, spherical video content may be stored with a 5.2K resolution. Using a 5.2K spherical video content may enable viewing windows for the spherical video content with resolution close to 1080p. In some implementations, spherical video content may include 12-bit video frames. In some implementations, spherical video content may be consumed as virtual reality content.

Virtual reality content may refer to content (e.g., spherical video content) that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

Figure 3:
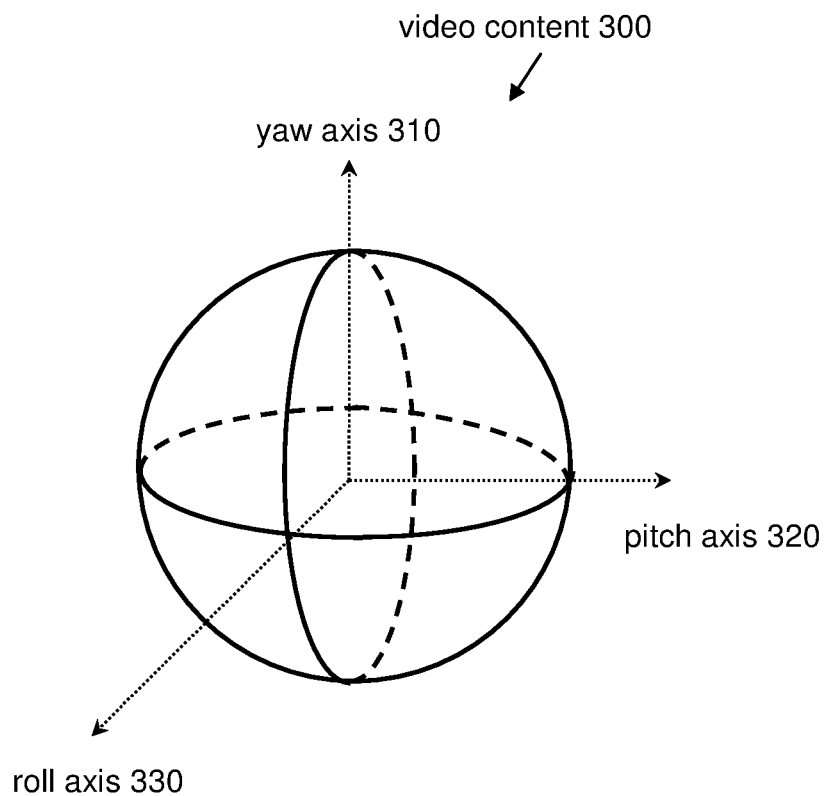
FIG. 3 illustrates an example spherical video content.

FIG. 3 illustrates an example video content 300 defined by video information. The video content 300 may include spherical video content. The video content 300 may define visual content viewable from a point of view (e.g., center of sphere) as a function of progress through the video content 300. FIG. 3 illustrates example rotational axes for the video content 300. Rotational axes for the video content 300 may include a yaw axis 310, a pitch axis 320, a roll axis 330, and/or other axes. Rotations about one or more of the yaw axis 310, the pitch axis 320, the roll axis 330, and/or other axes may define viewing directions/viewing window for the video content 300.

For example, a 0-degree rotation of the video content 300 around the yaw axis 310 may correspond to a front viewing direction. A 90-degree rotation of the video content 300 around the yaw axis 310 may correspond to a right viewing direction. A 180-degree rotation of the video content 300 around the yaw axis 310 may correspond to a back viewing direction. A −90-degree rotation of the video content 300 around the yaw axis 310 may correspond to a left viewing direction.

A 0-degree rotation of the video content 300 around the pitch axis 320 may correspond to a viewing direction that is level with respect to horizon. A 45-degree rotation of the video content 300 around the pitch axis 320 may correspond to a viewing direction that is pitched up with respect to horizon by 45-degrees. A 90 degree rotation of the video content 300 around the pitch axis 320 may correspond to a viewing direction that is pitched up with respect to horizon by 90-degrees (looking up). A −45-degree rotation of the video content 300 around the pitch axis 320 may correspond to a viewing direction that is pitched down with respect to horizon by 45-degrees. A −90 degree rotation of the video content 300 around the pitch axis 320 may correspond to a viewing direction that is pitched down with respect to horizon by 90-degrees (looking down).

A 0-degree rotation of the video content 300 around the roll axis 330 may correspond to a viewing direction that is upright. A 90 degree rotation of the video content 300 around the roll axis 330 may correspond to a viewing direction that is rotated to the right by 90 degrees. A −90-degree rotation of the video content 300 around the roll axis 330 may correspond to a viewing direction that is rotated to the left by 90-degrees. Other rotations and viewing directions are contemplated.

The touchscreen display 14 may be configured to present video content and/or other information. The touchscreen display 14 may be configured to receive user input during the presentation of the video content. The touchscreen display 14 may be configured to generate touchscreen output signals indicating locations on the touchscreen display 14 of user engagement with the touchscreen display 14. User input (e.g., for video content, for video application playing video content) may be received/determined based on the touchscreen output signals. For example, the touchscreen display 14 may include a touchscreen display of a mobile device (e.g., camera, smartphone, smartwatch, tablet, laptop) or a desktop device (e.g., touch monitor), and user may engage with the touchscreen display 14 to provide user input for video content presented on the touchscreen display 14 and/or video application playing the video content on the touchscreen display 14.

The touchscreen display 14 may include a touch-sensitive screen and/or other components. A user may engage with the touchscreen display 14 by touching one or more portions of the touch-sensitive screen (e.g., with one or more fingers, stylus). A user may engage with the touchscreen display 14 at a moment in time, at multiple moments in time, during a period, and/or during multiple periods. A user may tap on or move along the touchscreen display 14 to interact with video content presented the touchscreen display 14 and/or to interact with an application for presenting video content. For example, a user may pinch or unpinch (stretch) the touchscreen display 14 to effectuate change in zoom/magnification for presentation of the video content. A user may make a twisting motion (e.g., twisting two figures on the touchscreen display 14, holding one finger in position on the touchscreen display 14 while twisting another figure on the touchscreen display 14) to effectuate visual rotation of the video content (e.g., warping visuals within the video content, changing viewing rotation). A user may make a moving motion (e.g., holding one or more fingers on the touchscreen display 14 and moving the finger(s) in one or more particular directions) to effectuate changes in viewing directions for the video content (e.g., panning which visual portion of the video content is being presented on the touchscreen display 14). Other types of engagement with the touchscreen display 14 by users are contemplated.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate interacting with video content. The machine readable instructions 100 may include one or more computer program components. The machine readable instructions 100 may include one or more of an access component 102, a viewing window component 104, a presentation component 106, a user input component 108, a movement component 110, and/or other computer program components.

The access component 102 may be configured to access video information defining one or more video content and/or other information. Accessing video information may include one or more of acquiring, analyzing, determining, examining, loading, locating, obtaining, opening, receiving, retrieving, reviewing, storing, and/or otherwise accessing the video information. The access component 102 may access video information from one or more locations. For example, the access component 102 may access video information from a storage location, such as the electronic storage 12, electronic storage of information and/or signals generated by one or more image sensors, electronic storage of a device accessible via a network, and/or other locations. The access component 102 may access video information from one or more hardware components (e.g., an image sensor) and/or one or more software components (e.g., software running on a computing device).

The access component 102 may be configured to access video information defining one or more video content (e.g., spherical video content) during acquisition of the video information and/or after acquisition of the video information by one or more image sensors. For example, the access component 102 may access video information defining a video while the video is being captured by one or more image sensors. The access component 102 may access video information defining a video after the video has been captured and stored in memory (e.g., the electronic storage 12).

The viewing window component 104 may be configured to determine one or more viewing windows for the video content. The viewing window may define extents of the visual content viewable as the function of progress through the video content. The viewing window may define extents of the visual content presented on the touchscreen display 14 as the function of progress through the video content. For spherical video content, the viewing window may define extents of the visual content viewable from the point of view as the function of progress through the spherical video content.

The viewing window may be characterized by a viewing direction, viewing size (e.g., zoom), and/or other information. A viewing direction may define a direction of view for video content. A viewing direction may define the angle/portion of the video content at which the viewing window is directed. A viewing direction may define a direction of view for the video content selected by a user and/or defined by instructions for viewing the video content as a function of progress through the video content (e.g., director track specifying viewing direction as a function of progress through the video content). For spherical video content, a viewing direction may define a direction of view from the point of view from which the visual content is defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window is directed to a forward portion of the visual content captured within the spherical video content).

The viewing window component 104 may determine the viewing direction(s) for the video content based on user input indicating the desired viewing direction(s) (e.g., based on user engagement with a mouse, keyboard, and/or touchscreen display 14; based on rotation of a mobile device presenting the video content), based on instructions specifying viewing direction(s) as a function of progress through the video content (e.g., director track), based on system default(s), and/or other information.

Figure 4:
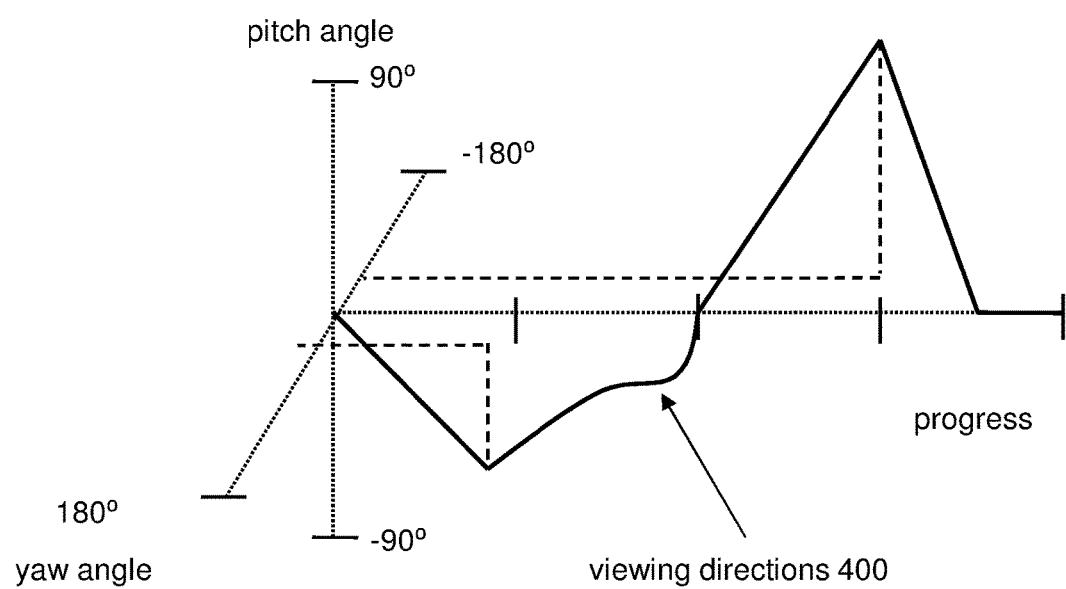
FIG. 4 illustrates example viewing directions for video content.

For example, FIG. 4 illustrates example changes in viewing directions 400 (e.g., selected by a user for video content, specified by a director's track) as a function of progress through the video content. The viewing directions 400 may change as a function of progress through the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. Other of viewing directions are contemplated.

Figures 5A, 5B:
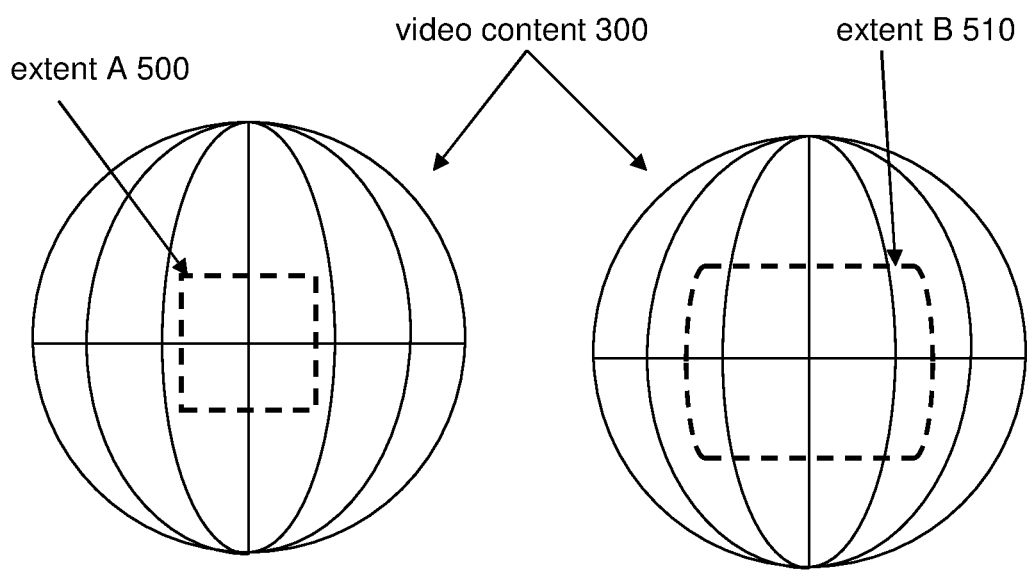
FIGS. 5A-5B illustrate example extents of spherical video content.

A viewing size may define a size (e.g., zoom, viewing angle) of viewable extents of visual content within the video content. A viewing size may define the dimensions of the viewing window. A viewing size may define a size of viewable extents of visual content within the video content selected by a user and/or defined by instructions for viewing the video content as a function of progress through the video content (e.g., director track specifying viewing size as a function of progress through the video content). FIGS. 5A-5B illustrate examples of extents for the video content 300. In FIG. 5A, the size of the viewable extent of the video content 300 may correspond to the size of extent A 500. In FIG. 5B, the size of viewable extent of the video content 300 may correspond to the size of extent B 510. Viewable extent of the video content 300 in FIG. 5A may be smaller than viewable extent of the video content 300 in FIG. 5B.

In some implementations, a viewing size may define different shapes of viewable extents. For example, a viewing window may be shaped as a rectangle, a triangle, a circle, and/or other shapes. In some implementations, a viewing size may define different rotations of the viewing window. A viewing size may change based on a rotation of viewing. For example, a viewing size shaped as a rectangle may change the orientation of the rectangle based on whether a view of the video content includes a landscape view or a portrait view. Other rotations of a viewing window are contemplated.

The presentation component 106 may be configured to effectuate presentation of the video content on the touchscreen display 14. The video content may be presented on the touchscreen display 14 based on the viewing window and/or other information. For example, based on the viewing direction(s) (such as shown in FIG. 4) and/or the viewing size(s) of the viewing window (such as shown in FIGS. 5A-5B) determined based on user selections and/or instructions, a given visual portion/extent of the video content may be presented on the touchscreen display 14. Such presentation of the video content may provide for a punch-out view of the video content.

The user input component 108 may be configured to determine reception of user input by the touchscreen display 14. The use input component 108 may be configured to determine different types of user input based on the touchscreen output signals (indicating different types of user engagement with the touchscreen display 14). For example, the user input component 108 may be configured to determine reception of an automatic movement input by the touchscreen display 14 during the presentation of the video content based on the touchscreen output signals and/or other information. An automatic movement input may include user engagement with the touchscreen display 14 that moves along the touchscreen display 14 to an edge of the touchscreen display 14 during an input period. Such user engagement with the touchscreen display 14 may include a user making a moving motion on the touchscreen display 14 by holding one or more fingers on the touchscreen display 14 and moving the finger(s) in one or more particular directions to the edge of the touchscreen display 14. The movement of the user's finger(s) along the touchscreen display 14 may cause a movement of the viewing window in one or more corresponding directions during the input period.

Figure 6A:
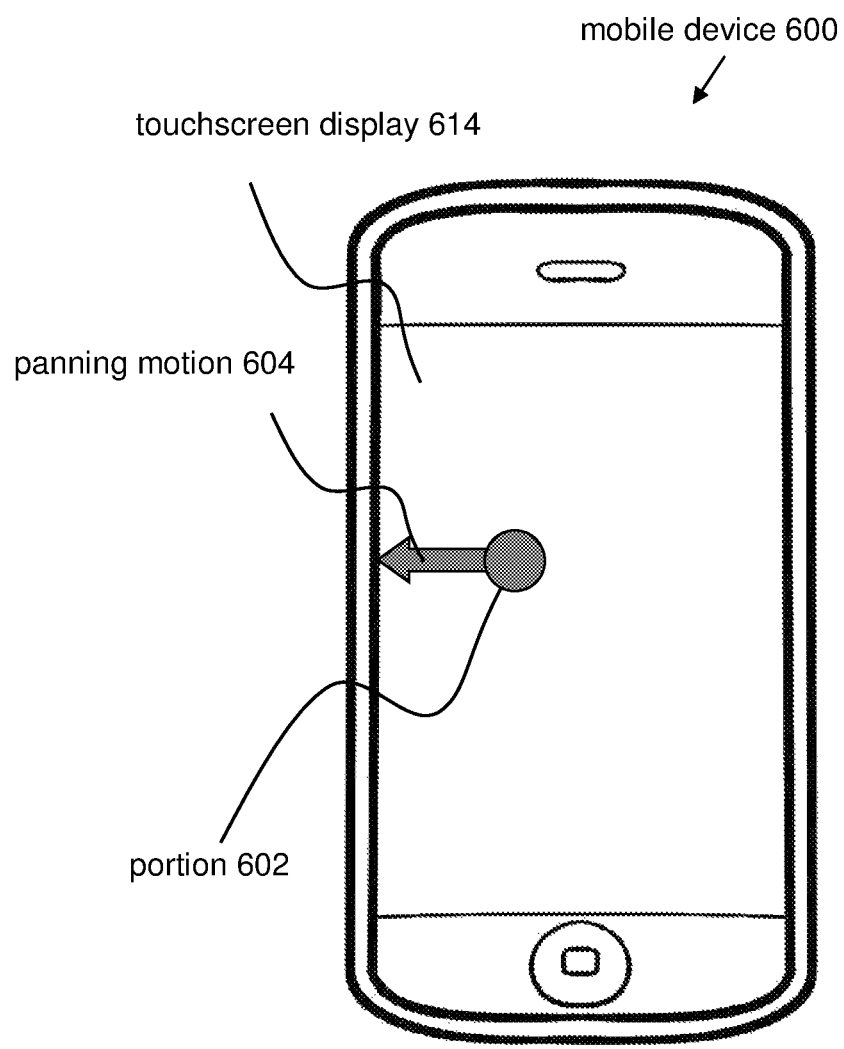
FIGS. 6A-6C illustrate example user engagements with a touchscreen display.

For example, FIG. 6A illustrates an example user engagement with a touchscreen display 614 of a mobile device 600. The user engagement in FIG. 6A may include a user holding one or more fingers on a portion 602 of the touchscreen display 614 and moving the finger(s) to the left in a panning motion 604 during an input period. The panning motion 604 may cause a movement of the viewing window in a corresponding direction (e.g., the viewing window is moved/panned to the right) during the input period. The user engagement in FIG. 6A may include the finger(s) being moved to the edge of the touchscreen display 614. The movement to the edge of the touchscreen display 614 may include moving the finger(s) to the physical edge of the touchscreen display 614, moving the finger(s) to a virtual edge of the touchscreen display 614 (e.g., located at a certain distance from the physical edge of the touchscreen display 614), moving the finger(s) over the physical edge of the touchscreen display 614, moving the finger(s) over the virtual edge of the touchscreen display 614, and/or other movement to the edge of the touchscreen display 614. Such movement on the touchscreen display 14 (panning gesture that moves to the edge of the display) may be determined by the user input component 108 as an automatic movement input.

In some implementations, the automatic movement input may further include user engagement with the touchscreen display 14 that includes a stretching gesture or a pinching gesture followed by a panning gesture to the edge of the touchscreen display 14. For example, referring to FIG. 6A, the user engagement may include the user making a pinching/stretching gesture at the portion 602 of the touchscreen display 614, followed by a panning motion 604 to the left of the touchscreen display 614. The pinching/stretching gesture at the portion 602 of the touchscreen display 614 may change the viewing size of the viewing window (e.g., change the zoom of viewing the video content at the visual extent corresponding to the portion 602).

Figure 6B:
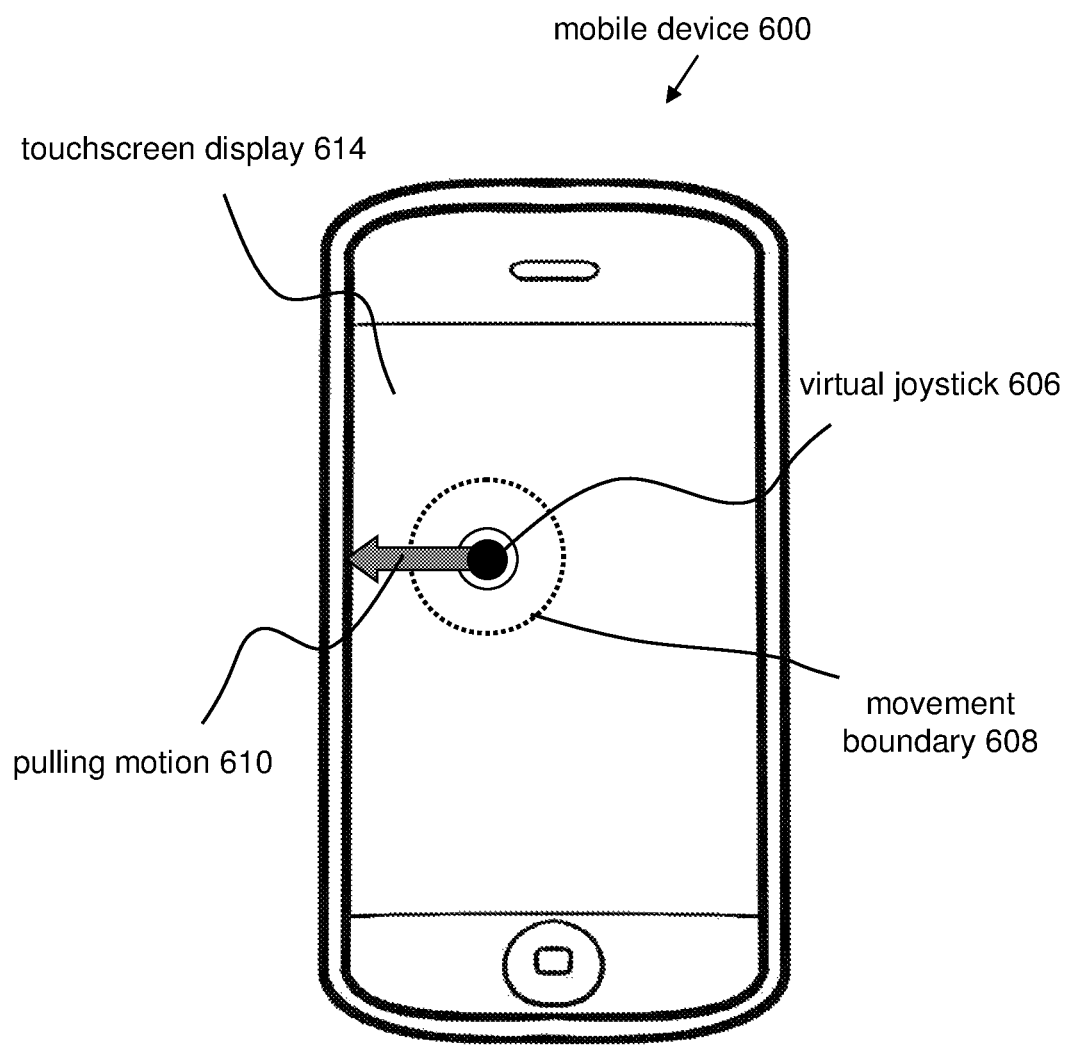

In some implementations, the automatic movement input may further include user engagement with the touchscreen display 14 that includes moving a virtual joystick to the edge of the touchscreen display 14 or a movement boundary of the virtual joystick. For example, FIG. 6B illustrates an example user engagement with a touchscreen display 614 of a mobile device 600 that includes the use of a virtual joystick 606. Responsive to user engagement with the touchscreen display 614 (e.g., tapping and/or holding one or more fingers on a portion of the touchscreen display 614), the virtual joystick 606 may be presented on the touchscreen display 614 (e.g., at the location of user engagement). The virtual joystick 606 may be used to move the viewing window for the video content. For example, the direction and/or speed of the movement of the viewing window may be determined based on the direction and/or the distance at which the user pulls the virtual joystick 606.

An automatic movement input may be determined by the user input component 108 based on a user pulling the virtual joystick 606 to the edge of the touchscreen display 14 (e.g., pulling motion 610). Pulling the virtual joystick 606 to the edge of the touchscreen display 14 may include pulling the virtual joystick 606 to the physical edge of the touchscreen display 614, pulling the virtual joystick 606 to a virtual edge of the touchscreen display 614, pulling the virtual joystick 606 over the physical edge of the touchscreen display 614, pulling the virtual joystick 606 over the virtual edge of the touchscreen display 614, and/or other movement of the virtual joystick 606 to the edge of the touchscreen display 614.

An automatic movement input may be determined by the user input component 108 based on a user pulling the virtual joystick 606 to a movement boundary of the virtual joystick 606. The movement boundary may refer to the limit to which the virtual joystick 606 may be pulled from its center. For example, the movement of the virtual joystick 606 may be limited to the movement boundary 608 shown in FIG. 6B. Pulling the virtual joystick 606 to the movement boundary 608 may be determined by the user input component 108 as an automatic movement input.

Figure 6C:
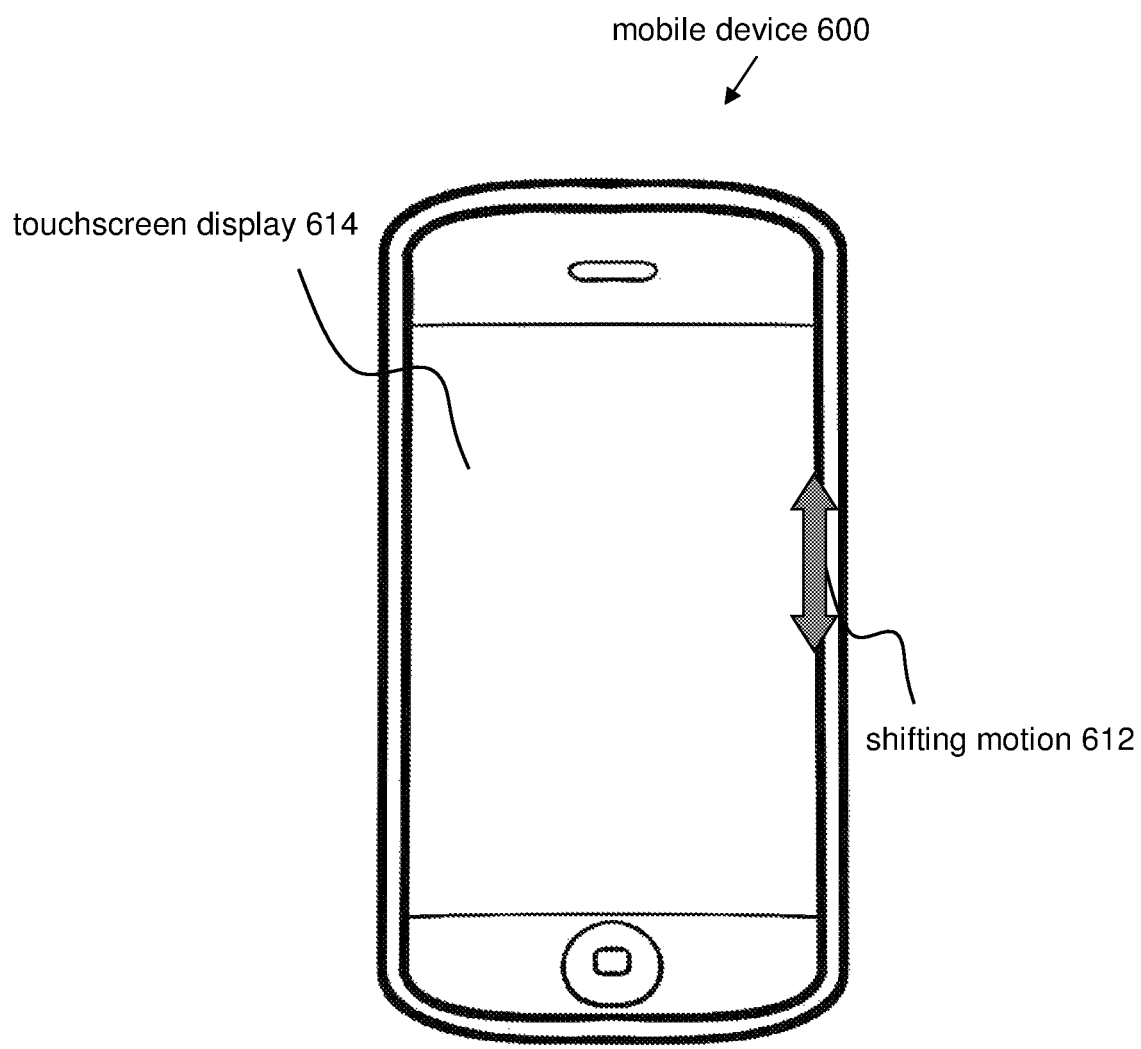

In some implementations, user input component 108 may be configured to determine reception of a shifting movement input by the touchscreen display 14. The user input component 108 may be configured to determine reception of a shifting movement input by the touchscreen display 14 during the movement of the viewing window after the input period based on the touchscreen output signals and/or other information. The shifting movement input may include user engagement with the touchscreen display 14 that moves along the edge of the touchscreen display 14. Such user engagement with the touchscreen display 14 may include a user making a moving motion along the edge of the touchscreen display 14 by holding one or more fingers on the touchscreen display 14 and moving the finger(s) parallel to the edge of the touchscreen display 14. For example, FIG. 6C illustrates an example user engagement providing a shifting movement input. In FIG. 6C, a user may making a shifting motion 612 may moving one or more fingers along the physical edge or the virtual edge of the touchscreen display 614. In some implementations, the shifting movement input may be determined based on user engagement that interacts with one or more user interface elements. For example, moving along the physical/virtual edge of the touchscreen display 614 may include user engagement with a user interface element (e.g., shifting bar) that is displayed on the touchscreen display 614.

Figures 7A, 7B:
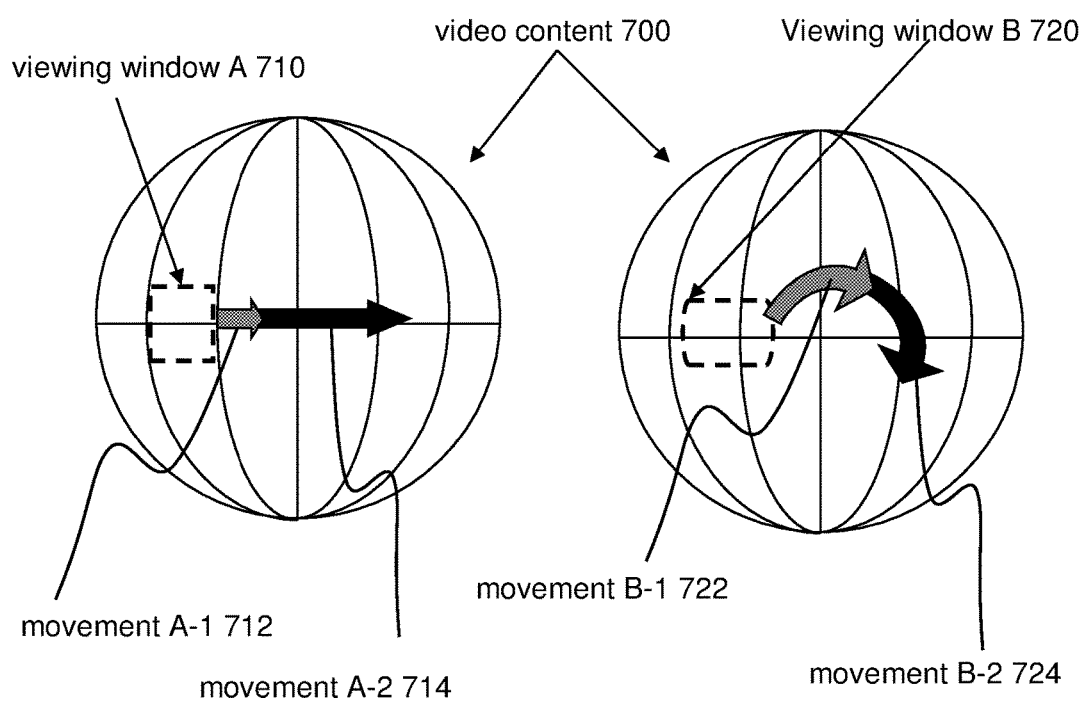
FIGS. 7A-7B illustrate example movements of viewing windows.

The movement component 110 may be configured to move the viewing window based on user input and/or other information. The movement component 110 may move the viewing window in one or more corresponding directions during the input period based on user engagement with the touchscreen display 14 that moves along the touchscreen display 14 and/or other information. For example, based on the panning motion 604 shown in FIG. 6A or the pulling motion 610 shown in FIG. 6B, the movement component 110 may move (e.g., pan) the viewing window to the right as shown in FIG. 7A (movement A-1 712 of a viewing window A 710). Other movements of the viewing window based on user engagement with the touchscreen display 14 are contempt.

The movement component 110 may, based on the automatic movement input and/or other information, continue moving the viewing window after the input period. For example, based on the panning motion 604 that moves to the edge of the touchscreen display 614, the movement component 110 may continue to move the viewing window A 710 to the right after the input period as shown in FIG. 7A. The movement of the viewing window A 710 after the input period may include movement A-2 714

The movement of the viewing window after the input period may be continuous with the movement of the viewing window during the input period. The movement of the viewing window after the input period may provide unbroken/uninterrupted movement of the viewing window from the input period. For example, referring to FIG. 7A, the movement A-2 714 of the viewing window A 710 to the right may be continuous with the movement A-1 712 of the viewing window A 710 to the right. The viewing window A 710 may continue to move to the right without further interaction from the user.

Such automation of viewing window movement may provide an intuitive control for navigation within video content (e.g., spherical video content), and provide for a fluid experience of over-capture videos. Rather than requiring users to continually reposition their fingers on the video content to see different extents of the video content, the automation of viewing window movements may allow the users to move the viewing windows in a smoothed and controlled manner without further interaction from the user.

The movement of the viewing window after the input period may be determined based on how the user engagement with the touchscreen display 14 moved along the touchscreen display 14, how the user engagement with the touchscreen display 14 moved to the edge of the touchscreen display 14, and/or other information. For example, the automatic movement of the viewing window may follow the (panning) gesture that led the finger(s) of the user/virtual joystick to the (physical/virtual) edge of the touchscreen display 14. The automatic movement of the viewing window may continue to move the viewing window based on the direction of the finger(s)/virtual joystick movement when it touched the physical/virtual) edge of the touchscreen display 14 or the boundary of the virtual joystick. The gestures that led the finger(s) of the user/virtual joystick to the edge of the touchscreen display 14 may include user engagement with the touchscreen display 14 at a point in time, over a period of time, at a location on the touchscreen display 14, or over a range of locations on the touchscreen display 14. For example, gesture to be used in determining the continuous movement of the viewing window after the input period may include gesture made by the user between the initial holding movement/stretching movement/pinching movement and the movement to the edge of the touchscreen display 14, gesture made by the user within a certain distance from the edge of the touchscreen display 14, gesture made by the user when the movement reached the edge of the display 14, gesture made by the user within a certain time period before reaching the edge of the touchscreen display 14, and/or other gestures.

In some implementations, the movement of the viewing window after the input period may include a linear movement. Linear movement may include movement in a straight line. For example, as shown in FIG. 7A, the automatic movement of the viewing window (movement A-2 714) may include a straight movement to the right based on the direction that the finger(s) touched the edge of the touchscreen display 14 or based on the gesture during the input period (e.g., resulting in movement A-1 712). For example, the user may have traced the figure(s) to the left when touching the edge of the touchscreen display 14 (panning the viewing window to the right), and the viewing window may continue to move to the right (in the opposite direction of the figure(s)).

In some implementations, the movement of the viewing window after the input period may include a non-linear movement. Non-linear movement may include movement in a non-straight line. For example, as shown in FIG. 7B, the automatic movement of the viewing window (movement B-2 724) may include a circular movement in a clockwise direction based on the gesture during the input period (e.g., resulting in the movement B-1 722). For example, the user may have traced the figure(s) to the edge using a circular arc, and the viewing window may continue to move along the circular arc.

In some implementations, the movement of the viewing window after the input period may follow an object captured within the video content. For example, the pinching/stretching gesture may center on a particular object (e.g., person, vehicle) captured within the video content and/or the panning gesture may follow the movement of the particular object within the video content (e.g., following the movement of the person/vehicle). Such pinching/stretching gesture and/or the panning gesture may cause the particular object to be tagged as an object of interest and the viewing window may be moved to keep the particular object within the viewing window (e.g., the viewing window stays centered on the particular object, the particular object stays within a certain region of the viewing window).

In some implementations, the movement component 110 may be configured to change a trajectory of the movement of the viewing window after the input period based on the shifting movement input and/or other information. Change in the trajectory of the movement of the viewing window after the input period may include change in linear direction and/or angular direction of the viewing window movement. For example, during the movement A-2 714 of the viewing window A 710, the user may engage with the touchscreen display 14 to provide an upward shifting movement input (e.g., sliding the finger(s) along the edge of the touchscreen display 14 to the top). Based on the upward shifting movement input, the trajectory of the movement A-2 714 may be changed so that it is directed upwards (moves to the right and upwards). The change in the trajectory of the automatic movement may last for the duration of the shifting movement input or after the duration of the shifting movement input. For example, referring to FIG. 7A, the movement A-2 714 may be restored to movement to the right (no vertical component) after the duration of the shifting movement input (moving along the equator of the spherical video content or along the latitude at which the viewing window reached at the end of the duration) or may continue in an upward-right trajectory. Other changes in trajectory of the movement of the viewing window are contemplated.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although the processor 11 and the electronic storage 12 are shown to be connected to the interface 13 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
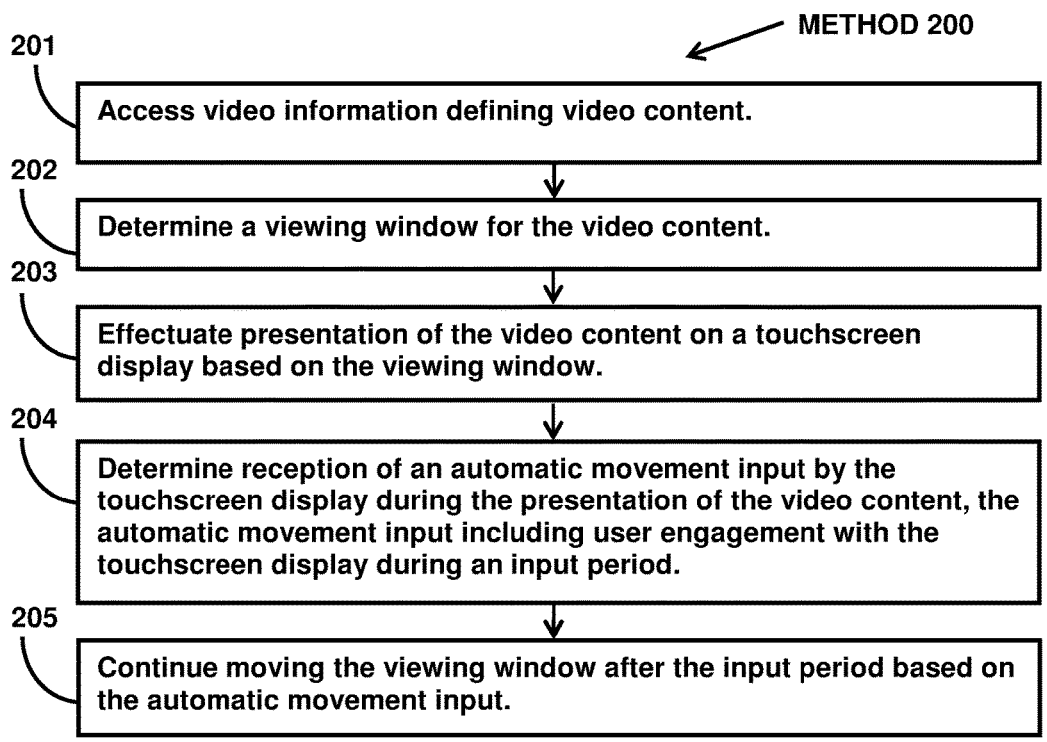
FIG. 2 illustrates a method for interacting with video content.

FIG. 2 illustrates method 200 for interacting with video content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining video content may be accessed. The video content may have a progress length. The video content may define visual content viewable as a function of progress through the video content. In some implementation, operation 201 may be performed by a processor component the same as or similar to the access component 102 (Shown in FIG. 1 and described herein).

At operation 202, a viewing window for the video content may be determined. The viewing window may define an extent of the visual content presented on a touchscreen display as the function of progress through the video content. In some implementations, operation 202 may be performed by a processor component the same as or similar to the viewing window component 104 (Shown in FIG. 1 and described herein).

At operation 203, presentation of the video content on the touchscreen display may be effectuated. In some implementations, operation 203 may be performed by a processor component the same as or similar to the presentation component 106 (Shown in FIG. 1 and described herein).

At operation 204, reception of an automatic movement input by the touchscreen display during the presentation of the video content may be determined, The automatic movement input may include user engagement with the touchscreen display that moves along the touchscreen display to an edge of the touchscreen display during an input period. The movement along the touchscreen display may cause a movement of the viewing window in one or more corresponding directions during the input period. In some implementations, operation 204 may be performed by a processor component the same as or similar to the user input component 108 (Shown in FIG. 1 and described herein).

At operation 205, the viewing window may continue to be moved after the input period based on the automatic movement input. The movement of the viewing window after the input period may be continuous with the movement of the viewing window during the input period. In some implementations, operation 205 may be performed by a processor component the same as or similar to the movement component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for interacting with video content, the system comprising:
   a touchscreen display configured to present the video content and receive user input during the presentation of the video content, the touchscreen display configured to generate touchscreen output signals indicating locations on the touchscreen display of user engagement with the touchscreen display; and
   one or more physical processors configured by machine-readable instructions to:
      access video information defining the video content, the video content having a progress length, the video content defining visual content viewable as a function of progress through the video content,
      determine a viewing window for the video content, the viewing window defining an extent of the visual content presented on the touchscreen display as the function of progress through the video content, a location of the viewing window with respect to the visual content characterized by a viewing direction of the viewing window, the viewing direction defining a direction of view of the viewing window for the visual content;
      effectuate presentation of the video content on the touchscreen display based on the viewing window;
      determine reception of an automatic movement input by the touchscreen display during the presentation of the video content based on the touchscreen output signals, the automatic movement input including user engagement with the touchscreen display that moves along the touchscreen display from a point within the touchscreen display to an edge of the touchscreen display during an input period, the movement along the touchscreen display causing a movement of the viewing window in one or more corresponding directions during the input period, the movement of the viewing window including one or more changes in the viewing direction of the viewing window in the one or more corresponding directions during the input period; and
      cause an automatic and continuous movement of the viewing window in at least one of the one or more corresponding directions after the input period based on the automatic movement input, the automatic and continuous movement of the viewing window after the input period continuous with the movement of the viewing window during the input period such that the viewing direction of the viewing window automatically and continuously changes in the at least one of the one or more corresponding directions after the input period without additional user input.

2. The system of claim 1, wherein the video content includes spherical video content, the spherical video content defining the visual content viewable from a point of view as the function of progress through the spherical video content.

3. The system of claim 1, wherein the viewing window is characterized by the viewing direction and a viewing size.

4. The system of claim 1, wherein the automatic movement input further includes user engagement with the touchscreen display that includes a stretching gesture or a pinching gesture followed by a panning gesture to the edge of the touchscreen display.

5. The system of claim 1, wherein the automatic movement input further includes user engagement with the touchscreen display that includes moving a virtual joystick to the edge of the touchscreen display or a movement boundary of the virtual joystick.

6. The system of claim 1, wherein the automatic and continuous movement of the viewing window after the input period includes a linear movement based on the movement of the viewing window during the input period including the linear movement, the linear movement including a change in the viewing direction of the viewing window along a straight line.

7. The system of claim 1, wherein the automatic and continuous movement of the viewing window after the input period includes a non-linear movement based on the movement of the viewing window during the input period including the non-linear movement, the non-linear movement including a change in the viewing direction of the viewing window along a non-straight line.

8. The system of claim 1, wherein the automatic and continuous movement of the viewing window after the input period follows an object captured within the video content.

9. The system of claim 1, wherein the one or more physical processors are further configured by the machine-readable instructions to:
   determine reception of a shifting movement input by the touchscreen display during the automatic and continuous movement of the viewing window after the input period based on the touchscreen output signals, the shifting movement input including user engagement with the touchscreen display that moves along the edge of the touchscreen display; and
   change a trajectory of the automatic and continuous movement of the viewing window after the input period based on the shifting movement input.

10. A method for interacting with video content, the method performed by a computing system including one or more physical processors, the method comprising:
   accessing, by the computing system, video information defining the video content, the video content having a progress length, the video content defining visual content viewable as a function of progress through the video content,
   determining, by the computing system, a viewing window for the video content, the viewing window defining an extent of the visual content presented on a touchscreen display as the function of progress through the video content, a location of the viewing window with respect to the visual content characterized by a viewing direction of the viewing window, the viewing direction defining a direction of view of the viewing window for the visual content, the touchscreen display configured to present the video content and receive user input during the presentation of the video content, the touchscreen display configured to generate touchscreen output signals indicating locations on the touchscreen display of user engagement with the touchscreen display;
   effectuating, by the computing system, presentation of the video content on the touchscreen display based on the viewing window;
   determining, by the computing system, reception of an automatic movement input by the touchscreen display during the presentation of the video content based on the touchscreen output signals, the automatic movement input including user engagement with the touchscreen display that moves along the touchscreen display from a point within the touchscreen display to an edge of the touchscreen display during an input period, the movement along the touchscreen display causing a movement of the viewing window in one or more corresponding directions during the input period, the movement of the viewing window including one or more changes in the viewing direction of the viewing window in the one or more corresponding directions during the input period; and
   causing, by the computing system, an automatic and continuous movement of the viewing window in at least one of the one or more corresponding directions after the input period based on the automatic movement input, the automatic and continuous movement of the viewing window after the input period continuous with the movement of the viewing window during the input period such that the viewing direction of the viewing window automatically and continuously changes in the at least one of the one or more corresponding directions after the input period without additional user input.

11. The method of claim 10, wherein the video content includes spherical video content, the spherical video content defining the visual content viewable from a point of view as the function of progress through the spherical video content.

12. The method of claim 10, wherein the viewing window is characterized by the viewing direction and a viewing size.

13. The method of claim 10, wherein the automatic movement input further includes user engagement with the touchscreen display that includes a stretching gesture or a pinching gesture followed by a panning gesture to the edge of the touchscreen display.

14. The method of claim 10, wherein the automatic movement input further includes user engagement with the touchscreen display that includes moving a virtual joystick to the edge of the touchscreen display or a movement boundary of the virtual joystick.

15. The method of claim 10, wherein the automatic and continuous movement of the viewing window after the input period includes a linear movement based on the movement of the viewing window during the input period including the linear movement, the linear movement including a change in the viewing direction of the viewing window along a straight line.

16. The method of claim 10, wherein the automatic and continuous movement of the viewing window after the input period includes a non-linear movement based on the movement of the viewing window during the input period including the non-linear movement, the non-linear movement including a change in the viewing direction of the viewing window along a non-straight line.

17. The method of claim 10, wherein the automatic and continuous movement of the viewing window after the input period follows an object captured within the video content.

18. The method of claim 10, further comprising:
   determining, by the computing system, reception of a shifting movement input by the touchscreen display during the automatic and continuous movement of the viewing window after the input period based on the touchscreen output signals, the shifting movement input including user engagement with the touchscreen display that moves along the edge of the touchscreen display; and
   changing, by the computing system, a trajectory of the automatic and continuous movement of the viewing window after the input period based on the shifting movement input.

19. A system for interacting with video content, the system comprising:
   a touchscreen display configured to present the video content and receive user input during the presentation of the video content, the touchscreen display configured to generate touchscreen output signals indicating locations on the touchscreen display of user engagement with the touchscreen display; and
   one or more physical processors configured by machine-readable instructions to:
      access video information defining the video content, the video content having a progress length, the video content defining visual content viewable as a function of progress through the video content, determine a viewing window for the video content, the viewing window defining an extent of the visual content presented on the touchscreen display as the function of progress through the video content, wherein the viewing window is characterized by a viewing direction and a viewing size, a location of the viewing window with respect to the visual content characterized by the viewing direction of the viewing window, the viewing direction defining a direction of view of the viewing window for the visual content;

effectuate presentation of the video content on the touchscreen display based on the viewing window;

determine reception of an automatic movement input by the touchscreen display during the presentation of the video content based on the touchscreen output signals, the automatic movement input including user engagement with the touchscreen display that moves along the touchscreen display from a point within the touchscreen display to an edge of the touchscreen display during an input period, the movement along the touchscreen display causing a movement of the viewing window in one or more corresponding directions during the input period, the movement of the viewing window including one or more changes in the viewing direction of the viewing window in the one or more corresponding directions during the input period;

cause an automatic and continuous movement of the viewing window in at least one of the one or more corresponding directions after the input period based on the automatic movement input, the automatic and continuous movement of the viewing window after the input period continuous with the movement of the viewing window during the input period such that the viewing direction of the viewing window automatically and continuously changes in the at least one of the one or more corresponding directions after the input period without additional user input;

determine reception of a shifting movement input by the touchscreen display during the automatic and continuous movement of the viewing window after the input period based on the touchscreen output signals, the shifting movement input including user engagement with the touchscreen display that moves along the edge of the touchscreen display; and change a trajectory of the automatic and continuous movement of the viewing window after the input period based on the shifting movement input.

20. The system of claim 19, wherein the video content includes spherical video content, the spherical video content defining the visual content viewable from a point of view as the function of progress through the spherical video content.

* * * * *